United States Patent Office 3,632,661
Patented Jan. 4, 1972

3,632,661
DEHYDROGENATING NORMAL PARAFFINS
WITH IMPROVED CATALYST
Edwin A. Matzner, St. Louis, Mo., assignor to Monsanto Company, St. Louis, Mo.
No Drawing. Filed Sept. 23, 1969, Ser. No. 860,418
Int. Cl. C07c 5/18, 11/02
U.S. Cl. 260—683.3     4 Claims

ABSTRACT OF THE DISCLOSURE

Detergent type alkylaryl sulfonates are prepared by separating normal paraffins from a petroleum fraction, dehydrogenating the normal paraffins to form mono-olefins, reacting the mono-olefins with a monocyclic aryl compound such as benzene and sulfonating the resulting alkylarylhydrocarbons. Novel dehydrogenation catalysts comprising iron, or oxides or alloys thereof and one or more noble metals of the platinum or palladium families deposited upon low acidity alumina are employed for the dehydrogenation of n-paraffins. The procedure using such novel catalysts results in improved conversions and the production of a purer product.

BACKGROUND OF THE INVENTION

This invention relates to the preparation of biodegradable alkylbenzene sulfonate detergent materials and to intermediates useful in the preparation of such detergent materials, and more particularly, the invention relates to processes for producing detergent materials wherein a long chain paraffin is dehydrogenated to produce a mono-olefin utilizing an improved dehydrogenation catalyst.

It has previously been suggested that paraffin materials separated from petroleum oils or obtained from other suitable sources be dehydrogenated using a dehydrogenation catalyst to produce a material containing long chain mono-olefins, and that the long chain mono-olefins thus produced be reacted with a monocyclic aromatic material such as benzene to produce a detergent alkylate which can be sulfonated to produce an organic anionic detergent active material. Numerous dehydrogenation catalysts have been suggested for use in conducting the dehydrogenation of long chain paraffin materials but all catalysts available prior to this invention have had certain disadvantages. The most serious of such disadvantages is a tendency to produce relatively large amounts of by-products including diolefins and/or aromatics. The production of such by-products not only produces a possible source of contamination for the finished detergent material but also results in decreased yields and the necessity of operating at exceedingly low conversion rates per pass to thereby favor the production of mono-olefins. Other disadvantages of prior art catalysts include in many instances the necessity of utilizing high temperatures or the necessity of using large quantities of expensive noble metals.

SUMMARY OF THE INVENTION

It is an object of this invention to provide improved catalysts particularly suited for dehydrogenation of linear paraffins to corresponding mono-olefins. A further object is to provide improved methods for dehydrogenation of paraffins and for production of alkylaryl compounds and sulfonates thereof.

These objects are achieved by means of catalysts comprising iron or oxides or alloys thereof and one or more noble metals of the platinum or palladium families deposited upon low acidity alumina and by the use of such catalysts to effect dehydrogenation of paraffins as hereinafter described.

The invention will be understood from the following description of the preferred embodiments.

DESCRIPTION OF THE PREFERRED EMBODIMENTS

In accordance with this invention, the dehydrogenation reaction is conducted utilizing a catalyst comprising iron, or iron oxides, or alloys (e.g., steel) thereof, hereinafter referred to as "promoter metal," and a noble metal or noble metal oxide of the platinum or palladium families deposited upon a low acidity alumina support having a surface area of at least 10 square meters per gram and a macropore volume of at least 0.05 cc. per gram. Such a catalyst provides a remarkably high conversion to mono-olefins even when the ratio of promoter metal to noble metal is relatively high and, in addition, has a selectivity such that the amounts of undesirable by-product produced are exceedingly low as compared to products produced utilizing prior art catalysts.

The paraffin materials utilized in accordance with this invention can be derived from any suitable source and can, for example, be prepared by reduction of long chain aliphatics produced by Fischer-Tropsch synthesis, or by any other suitable means. The desired normal paraffins, however, are most readily obtained from petroleum sources by known methods of separation. For example, a suitable paraffin material can be obtained by passing a petroleum fraction of a boiling range selected to include praffins of the proper chain length for use as detergents to a molecular sieve bed containing a synthetic zeolite having a pore diameter of from 5 to 15 A. and preferably a pore size of about 5 A. Such molecular sieves and methods for their use in separating paraffins from petroleum feed stocks are well known in the art and the molecular sieve materials are commercially available from numerous suppliers.

There can be employed in accordance with the present invention straight chain paraffins having a chain length of from about 8 to 24 carbon atoms and the particular chain length or range of chain lengths employed will depend upon the intended use of the detergent composition to be prepared. Since by most production techniques, one obtains a mixture of normal paraffins of varying chain lengths rather than a single normal paraffin, it is an advantage of the invention that a mixture of normal paraffins can be employed. In fact, for most applications, one can obtain comparable results with a mixture having an average chain length equal to the single chain length of pure normal olefin found to be most desirable for the particular end use of interest if one selects the mixture such that the range of chain lengths is not more than about 6 carbon atoms and preferably, not more than about 3 or 4 carbon atoms. For example, if for a particular end use application n-dodecyl benzene sulfonate has been found to be the most desirable, results comparable to those using n-dodceyl benzene sulfonate can be obtained by using a mixture of n-alkylbenzene sulfonates having an average chain length of 12 and wherein the homologue range for the alkyl group is limited to from $C_{11}$ to $C_{14}$ or even more desirably from $C_{11}$ to $C_{13}$. For detergent applications, the paraffin mixture will have in most instances an average chain length of from $C_{10}$ to $C_{15}$ with not more than a 2 to 3 carbon atom spread on either side of the mean.

The catalysts used in accordance with the present invention can comprise iron or oxides or alloys thereof and one or more noble metals or oxides of the platinum or palladium families provided the metals are properly deposited in the correct ratios and amounts on a proper alumina support. Of course, as is well known and as is disclosed in the prior art, pure alumina or alumina containing a deposit only of certain of the promoter metals, or alumina containing a deposit only of platinum or other noble metal of the platinum or palladium families can be employed to dehydrogenate paraffins to produce at least a small percentage of mono-olefins in combination with other materials, but to obtain the benefits of the present invention, both the promoter metal or oxide and a noble metal or oxide of the platinum or palladium families must be present in the required ratios or amounts upon an alumina support having specific physical and chemical characteristics as subsequently will be explained in greater detail.

The preferred noble metal for use in preparing a catalyst in accordance with the present invention is platinum so it will be seen that the preferred combination is platinum and iron. Other noble metals can be employed with excellent results, and in lieu of platinum, one can employ an equivalent amount of iridium, osmium, palladium, ruthenium, or rhodium, or mixtures thereof. In some instances, a mixture of noble metals or noble metal oxides is highly desirable and, for example, excellent results can be obtained by using a combination of metals such that the catalyst contains from 0.1% to 4% iron, 0.003% to 1% platinum, and 0.001% to 1% rhodium, the total combined percentage of platinum and rhodium being from 0.02% to 2% by weight of the catalyst.

The alumina used as a support in the preparation of a catalyst in accordance with this invention is required to have certain chemical and physical properties for satisfactory results to be obtained. A first requirement is that the alumina must be thermally stable so that it is capable of withstanding temperatures within the range of 400° C. to 500° C. for from one to twelve hours in the presence of oxygen or oxygen-containing gases. This is necessary so that during high temperature operations to which the catalyst will be subjected in preparation, use, or regeneration, the alumina support will not undergo physical change such as to result in the occlusion of significant amounts of the metal or metal oxide deposits which are required to be present upon the surfaces of the alumina support. If there is any doubt that the catalyst support to be employed will not meet this test, the support, before any noble metal or promoter metal is deposited upon it, should be heated to a temperature of at least 500° C., but below about 700° C., in the presence of oxygen for several hours to determine if this results in the alumina support undergoing obvious physical or chemical change.

Another requirement of the alumina support is that it be low acidity alumina and have an acidity factor as hereinafter defined no greater than about 2. The acidity factor is determined by placing the alumina support material prior to the time that any metal or metal oxide has been deposited upon its surfaces in a reactor at a temperature of 435° C. to 440° C. while passing through the reactor and into contact with the alumina a hydrocarbon mixture of 92 weight percent n-dodecane and 8 weight percent n-α-dodecene admixed with hydrogen in a mole ratio of 2 parts hydrogen to one part hydrocarbon mixture. The hydrocarbon-hydrogen mixture should be passed over the alumina base under a pressure of one atmosphere±2 pounds per square inch and at a space velocity of 4.65 LHSV. The hydrocarbon mixture after being passed over the alumina support material is then passed through a gas chromatograph in which the chromatographic column is packed with a substrate for separating the mixture according to boiling point and polarity. 1% by weight $AgNO_3$ plus 18% by weight Carbowax 20M polyethylene glycol on Chromasorb W diatomaceous earth, is a suitable and preferred substrate. The numerical value of the weight percent material, based on the total weight of the hydrocarbon mixture introduced to the column, which is eluted from the column prior to n-dodecane represents the acidity factor as this term is employed in the present specification and claims. As previously mentioned, the acidity factor should be no greater than about 2.0 and preferably not in excess of 1.0.

It will be apparent that the acidity factor as determined above is a measure of the cracking which results from passing a hydrocarbon mixture in contact with the alumina support material under controlled conditions, and if the alumina support material has an acidity such that a large amount of cracking results, the acidity of the support material is unsatisfactory for use in accordance with this invention.

In addition to the above, the alumina catalyst base for satisfactory results must have a surface area of at least about 10 square meters per gram and preferably should have a surface area of at least 30 square meters per gram. There is no operative upper limit as to surface area per gram that the catalyst can have, but it is difficult to prepare alumina catalyst base which is thermally stable and which has a surface area of above about 450 square meters per gram so that this constitutes a practical upper limit. Similarly, the alumina catalyst base must have a macropore volume of at least 0.05 cc. per gram and preferably has a macropore volume of at least 0.07 cc. per gram. There is no upper limit as to the macropore volume that the alumina catalyst base can suitably have as long as the requirements set forth above are met. The term "macropore volume" refers to the total volume of pores having a radius greater than 350 A. per unit weight of alumina and is measured using an Aminco-Winslow mercury porosimeter, model 5-7107 (American Instrument Company), or equivalent apparatus to determine the internal volume penetrated between 0 and 2500 p.s.i.g.

The catalyst base can have any suitable physical form consistent with the above and, for example, may suitably be in the form of spheres, cylindrical tablets or aggregates having mean diameters of from about 1/64 to 1/2 inch. Particle size, however, is of secondary importance as long as the other requirements set forth herein are met and the catalyst base particles may have almost any convenient mean diameter.

The amount of promoter metal or metal oxide deposited on the surfaces of the catalyst base can be varied within wide limits. With uniform distribution of the promoter a discernible improvement can be obtained by the use of as little as about 0.01% by weight. At the other extreme, the amount of promoter metal or metal oxide deposited upon the base support can be as high as 10% by weight or more although such large amounts are not generally advantageous as the use of such large amounts tends to reduce the available surface area of the catalyst material, and seldom it is advantageous to employ more than about 10% by weight of any promoter metal or metal oxide based upon the over-all weight of catalyst. The preferred amount of iron metal or metal oxide to be deposited upon the catalyst base is generally from about 0.1% to about 5% by weight. As will be recognized by those familiar with dehydrogenation technology, optimum amounts of various metal combinations can be determined by routine experimentation.

It is an advantage of the invention that the quantity of noble metal or noble metal oxide contained in the catalyst can satisfactorily be appreciably reduced from the amount of noble metal usually required in platinum-alumina dehydrogenation catalysts, and acceptable results can be obtained using as little as 0.005% noble metal or oxide based on the over-all weight of the catalyst material. Generally, however, for best results, the amount of platinum or other noble metal or noble metal oxide on the catalyst should be at least about 0.02% by weight and preferably about 0.1% by weight to provide a safety margin. Excess noble metal is not detrimental to the activity or selectivity of the catalyst, and if desired, one can use as much as about 5% by weight of noble metal or oxide, although there is seldom, if ever, any advantage in utilizing a catalyst which contains more than about 1% or 2% by weight of noble metal or noble metal oxide.

It appears to make little difference in the results which can be obtained whether the metals employed in accordance with this invention are deposited upon the alumina catalyst base in metallic form or in the form of metal oxides, and in most instances, one need not ascertain whether or not either the promoter metal or the noble metal or metals are present in the catalyst as oxides or in metallic form. This is believed to be because the catalyst is normally employed for dehydrogenation in a reducing atmosphere so that even if the metals in the catalyst are initially present in the form of oxides, at least a surface layer of elemental metal is present on the metallic deposits during use of the catalyst.

In addition to the promoter metal and noble metal which are present in the catalyst, other metals or metal ions may be present in amounts of up to about 5% by weight of the catalyst. For example, it is in some instances advantageous for the catalyst to contain from about 0.01% to about 3% and preferably from about 0.2% to 2% of one or more akali metals such as sodium, potassium, or lithium as the presence of alkali metal ions tends to insure a low acidity catalyst base and in some instances appears to produce improved results. The alkali metal can be present in any form but is usually present in combined form or, in other words, as oxides, combined oxides with alumina, or in the form of other compounds. Copper, silver and gold can also be present in amounts of from .002 to 5% or more even as much as 25% by weight. From .01 to 4% by weight cobalt or zinc can be employed in the catalyst if desired.

The catalyst of the present invention can be prepared in a straightforward manner by immersing the alumina catalyst base in a solution or solutions of heat decomposable salts of the metals to be employed and thereafter heating the impregnated catalyst to result in the liberation of the metals upon the alumina base. The promoter metal or metals and the noble metal or metals can satisfactorily be deposited upon the catalyst base simultaneously by using a solution containing salts of both or alternatively, the promoter metal can be first applied and the intermediate catalyst material heated at a high temperature to result in decomposition of the promoter metal salt and the calcined material thereafter impregnated with a solution of one or more noble metal salts. Similarly, the noble metal can be first applied followed by application of the promoter metal or metals. The latter procedure, however, is not usually advantageous, and this is particularly true when relatively large amounts, i.e., over 5% by weight, of the promoter metal or metals are to be employed. As between first applying the promoter metal or metals in a separate operation and simultaneously applying the promoter metal or metals and the noble metal or metals, there appears to be little reason to prefer one procedure over the other. In some instances, however when the ratio of promoter metal to noble metal is to be higher than about 2:1, somewhat better results are obtained by applying the promoter metal or metals in a separate operation and thereafter applying the noble metal or metals.

While any of the heat decomposable soluble salts of the metals to be deposited on the alumina base can be employed in accordance with this invention, best results are usually obtained by the use of non-halogen containing salts in which the anion is readily volatile or decomposable and does not contaminate the resulting catalyst material. Halogen salts of the promoter metals and noble metals, while usable, are not usually advantageous because their use results in the catalyst containing at least some halogen ions, and the presence of halogen ions in the catalyst material, even in small amounts, promotes undesirable side reactions. Similarly, metal sulfates are usually not advantageous because the sulfate ion is removed from the catalyst material only with difficulty, and the presence of sulfate ions in the catalyst even in small amounts can be disadvantageous. The preferred promoter salts are the nitrates or the basic carbonates of these metals dissolved in ammonium hydroxide solution. As between the nitrates and basic carbonates, the nitrates are usually more soluble and are usually preferred. The preferred noble metal salts are the diamino dinitrites such as platinum diamino dinitrite and palladium diamino dinitrite, and the noble metal amino hydroxides such as platinous dihydroxy diamine and palladium dihydroxy diamine. These salts can advantageously be applied to the alumina base from a solution in aqueous ammonium hydroxide.

Almost any suitable solvent for the promoter and noble metal salts can be employed in accordance with this invention, but it is an advantage of the invention that an aqueous solvent, such as water or ammonium hydroxide solution, can be employed. The preferred solvent for the noble metal salt, as mentioned above, is usually aqueous ammonium hydroxide, and the preferred solvent for the promoter metal salt is usually water unless the promoter metal salt is to be applied simultaneously with the noble metal salt in which case the preferred solvent is aqueous ammonium hydroxide.

For impregnation of the catalyst base, any desired amount of the solution or solutions of the promoter metal salt and of the noble salt can be employed, although a sufficiently large volume of solution should be employed in each instance to permit uniform deposition of the metal salts. A very satisfactory procedure has been found to be to use that volume of solution in each instance which is only slightly less than the amount required to fully saturate the base material. The amount of solution required to saturate the base material can readily be determined by tests conducted on a small sample of the base material.

As will be readily apparent to those skilled in the art, the concentration of the promoter metal salts and noble metal salts in the solution or solutions of the same used in the impregnation of the catalyst base determines the amount of the metals which the finished catalyst contains and a solution concentration should be selected to provide the specifically desired amount of each metal. If the metal salt in any instance is not sufficiently soluble to permit the desired amount of the metal to be deposited in a single application, the metal can be applied in a plurality of steps by heating the catalyst subsequent to each application to thereby decompose the metal salt so that it will not be dissolved from the catalyst material when it is again immersed to deposit additional metal salt or salts thereon.

Except for the use of a catalyst prepared as described above, the dehydrogenation step can be conventional in nature. In most instances, a continuous dehydrogenation conducted with the long chain paraffin in the vapor phase is most andvantageous, and due to the high specific activity of the catalyst of the present invention, can be satisfactorily conducted without excessive cracking or cyclization of the paraffin feed material. The temperature of the catalyst material and of the hydrocarbon feed stock in contact with the catalyst material can satisfactorily range from about 400° C. to 650° C. with the preferred temperature range being in most instances from 420° C. to 520° C. At temperatures below about 400° C., the reaction rate is undesirably slow and at temperatures above 650° C., excessive side reactions occur. The reaction can be conducted at any suitable pressure from about one-half to ten atmospheres, but it is an advantage of the invention that it can be conducted at substantially atmospheric pressures, and a pressure of from about 0 to 30 p.s.i.g. is generally preferred.

The hydrogen vapors brought into contact with the dehydrogenation catalyst in accordance with this invention are preferably diluted with hydrogen since it has been found that the presence of hydrogen in the feed stream, at least in some instances, disfavors the formation of polyolefins and reduces the deposition of carbon on the catalyst. The ratio of hydrogen to hydrocarbon material in the feed stock can be varied within relatively wide limits and, for example, the mole ratio of hydrogen to saturated hydrocarbon may suitably range from about 0.1:1 to 50.1. However, it is seldom if ever advantageous to employ a hydrogen to saturated hydrocarbon mole ratio greater than about 10:1, and the preferred mole ratio of hydrogen to saturated hydrocarbon is from about 1:1 to about 5:1.

The time that the saturated hydrocarbon is in contact with the dehydrogenation catalyst, as measured by the liquid hourly space velocity (LHSV=liquid volume of hydrocarbon feed per hour per volume of catalyst in the reactor), can vary within wide limits and, for example, the LHSV can range from about 1.0 to about 100. If the LHSV is higher than about 100, the degree of conversion is so small as to require an impractical degree of recycling through the catalyst bed, and if the LHSV is substantially lower than about 1.0, the formation of excessive amount of diolefins is promoted. In most instances, the preferred LHSV is from about 5 to about 50.

Following the dehydrogenation operation, the mono-olefin material is separated from the other components of the reaction mixture and recovered by any suitable procedure. The preferred procedure for separation of the mono-olefin material from unreacted hydrocarbons comprises reacting the mono-olefins with a selected aromatic hydrocarbon in the presence of unreacted paraffins and thereafter separating the resulting alkyl aromatic material from unreacted paraffin material by distillation.

Any suitable aromatic hydrocarbon material can be employed for reaction with the mono-olefins produced in accordance with this invention, and examples of suitable aromatic hydrocarbons include toluene, xylene, cumene, and other lower alkylbenzenes in which the number of alkyl side chains is not in excess of about 2, and the alkyl chain length in each instance is not in excess of 4 carbon atoms. The preferred aromatic material is benzene.

The alkylation reaction can be conducted in a conventional manner utilizing any Friedel-Crafts catalyst such as aluminum chloride, boron trifluoride, or hydrogen fluoride. The preferred alkylation catalyst is hydrogen fluoride since the use of this catalyst under usual conditions inherently results in an alkylaryl product having a particularly desirable isomer distribution, and in particular, a product in which a large percentage of the isomers are those in which the aromatic group is centrally attached with respect to the long aliphatic chain and which contains a relatively small percentage of 2-isomer materials or in other words, isomers in which the aromatic group is attached in the 2 position on the aliphatic chain.

The alkylation reaction for the production of the alkylaryl hydrocarbon can be conducted using conventional temperatures and pressures and using conventional ratios of reactants. The specific reaction temperature most advantageously employed depends upon the particular alkylation catalyst used and other considerations, but in most instances, will range from −20° C. to +80° C. With HF catalyst, a reaction temperature of −10° C. to +10° C. is generally most advantageous unless the use of a higher temperature is desired to reduce the formation of organic fluorine containing compounds which can contaminate the recycle paraffins. High temperature HF alkylation in accordance with the disclosure of U.S. Pat. No. 3,349,144 is highly advantageous when paraffins are to be recycled to a dehydrogenation reactor containing a dehydrogenation catalyst in accordance with this invention.

The ratio of catalyst to olefin can be conventional, and the preferred ratio will depend upon the particular catalyst employed. For example, when employing an HF catalyst, the molar ratio of olefin to catalyst can range from about 1:5 to about 1:25 with the preferred ratio being from about 1:15 to about 1:20.

It is an advantage of the invention that the alkylation reaction can be satisfactorily conducted at substantially atmospheric pressure. If desired, however, the reaction can be conducted under either vacuum or under high pressure and one can employ, for example, pressures ranging from 0.1 to 10 atmospheres with satisfactory results.

As in conventional practice, it is generally advantageous to employ an excess of the aromatic reactant to minimize formation of by-products in which a single aromatic nucleus is substituted with a plurality of alkyl groups and, for example, a molar ratio of aromatic reactant to alkyl reactant of at least about 5:1 is preferably employed. Because of the larger quantities of material which must be handled, however, it is generally impractical to employ an aromatic to olefin ratio of more than about 30:1, and it is seldom advantageous to employ an aromatic to olefin ratio in excess of about 10:1. At the other extreme, one can employ an aromatic to olefin ratio of as low as 1:1 if a reaction product containing a relatively high percentage of polysubstituted aromatics is acceptable.

The alkylaryl product prepared as above-described can be transformed into anionic detergent active material by sulfonation and neutralization by conventional procedures. For example, sulfonation can be effected by the use of either sulfur trioxide or by the use of sulfuric acid, and the resulting alkylaryl sulfonic acid can be neutralized with an alkali metal hydroxide or carbonate, such as sodium carbonate or potassium hydroxide, or by the use of any other suitable base conventionally employed in the manufacture of alkylaryl sulfonate detergent actives.

The invention will now be illustrated by the following specific examples in which all parts are by weight unless otherwise indicated:

Example I

Preparation of n-paraffin feed.—A linear paraffin feed material is prepared by molecularly sieving by standard molecular sieve techniques a petroleum fraction rich in paraffins and having a boiling range of from 190° C. to 260° C. The paraffin fraction is separated into a plurality of cuts by conventional distillation and a fraction having a boiling range of from 200° C. to 250° C. is hydrogenated to reduce impurities. This fraction analyzes approximately 99% straight chain paraffins in the $C_{11}$ to $C_{14}$ chain length range.

Preparation of dehydrogenation catalyst.—In a suitable vessel equipped with a low velocity agitator, there are placed 500 parts by weight of low acidity (acidity factor 0.1) alumina pellets having an average diameter of approximately ⅛ inch. The alumina is heat-stable at temperatures up to about 600° C., contains approximately 0.3% sodium in combined form, has a macropore volume of approximately 0.18 cc. per gram, and has a surface area of approximately 190 square meters per gram. There is then added to the alumina pellets a ferric nitrate solution containing 10 parts by weight of iron diluted to a volume slightly less than that required to fully saturate the alumina material as determined by a test on a small sample of the alumina, and agitation is continued until the solution has been completely absorbed by the alumina. The thus treated alumina pellets are then dried at 120° C. for approximately 16 hours, are thereafter calcined in air at a temperature of 600° C. for two hours, and are then allowed to cool. The cooled alumina pellets containing approximately 2% by weight of iron are then placed in a suitable vessel and there is added an ammoniacal equeous solution of platinum diamino dinitrite containing 2.5 parts of platinum diluted to a volume slightly less than that required to fully saturate the iron treated alumina pellets. The pellets are stirred until the platinum salt solution has been completely absorbed and are than dried at 120° C. for sixteen hours. The dried pellets are then calcined in air at a temperature of about 420° C. to about 430° C. for two hours following which the catalyst contains approximately 0.5 weight percent of platinum and is ready for use.

Dehydrogenation.—In a suitable flow-through reactor there are placed 11 parts by volume of an iron-platinum on alumina catalyst as prepared above. The catalyst bed is heated to a temperature of appoximately 450° C. and there is then passed through the reactor a mixture of $C_{11}$–$C_{14}$ n-paraffins, as prepared above, and hydrogen in a molar ratio of 2:1. The inlet temperature of the gases is such as to retain the catalyst bed at a temperature of approximately 450° C. and the gas flow rate is such as to provide an LHSV of 45. The gases from the reactor are cooled to result in condensation of the organic components thereof, and the hydrogen is purified for reuse.

Alkylation.—390 parts by weight of benzene and 260 parts of anhydrous HF are placed in a suitable alkylation reactor equipped with a stirrer, thermocouple, cooling coil, and sample port. The benzene is heated to a temperature of about 50° C., and there is added, over a period of about 5 to 10 minutes while maintaining the reaction mixture at a temperature of 50° C. and with agitation, 1000 parts by weight of an olefin containing hydrocarbon mixture prepared as above so that the molar ratio of benzene to olefin is approximately 6:1 and the molar ratio of HF to olefin is about 18:1. The reaction mixture is then stirred at a temperature of 50° C. for an additional 20 minutes after which it is allowed to remain in a quiescent condition for a period of at least 10 minutes. The lower catalyst phase and the upper alkylated liquor phase are then separated, and the alkylated liquor is fractionally distilled to remove unreacted benzene, HF and unreacted paraffins. Distillation is continued at reduced pressure and a fraction boiling at from about 110° C. to about 170° C. at 2 mm. of mercury is collected as the alkylbenzene product.

Sulfonation.—500 parts of the purified alkylbenzene product, as prepared above, are placed in a sulfonation reactor, and there are slowly added over a period of about 20 minutes 600 parts of 20% oleum. The resulting mixture is retained at a temperature of about 25° C. for approximately one hour and then is quenched with approximately 200 parts of cold water. The mixture is then retained in a quiescent condition for approximately one hour and the sulfuric acid layer is separated. The sulfonic acid is then neutralized with 50% aqueous sodium hydroxide. The neutralized solution of sodium alkylbenzene sulfonates is useful as a biodegradable surface active agent and can, for example, be slurried with sodium tripolyphosphate and other conventional detergent ingredients and spray dried to proudce an excellent built detergent product.

Example II

The procedure of Example I is used, except that the concentration of the iron salt solution is varied to produce catalysts containing from 0 to 2% iron and in one instance the addition of the platinum salt solution is omitted to produce a catalyst containing no noble metal. The various iron platinum catalysts are in each instance utilized for the dehydrogenation of n-dodecane (99% purity) prepared by the procedure of Example I and the products obtained from the dehydrogenation reaction are checked to determine the percentage of the paraffin converted into mono-olefin in a single pass through the reactor at 450° C. and a liquid hourly space velocity of 140. Table I sets forth results obtained in this manner, giving the average percent conversion of paraffin to mono-olefins by each catalyst for the first six hours of operation and the average percent conversion during a four hour period extending from the twentieth to twenty-fourth hour of operation.

TABLE 1

| Catalyst number | Percent iron | Percent platinum | Percent mono-olefin 0-6 hours | 20-24 hours |
|---|---|---|---|---|
| 1 | 0.0 | 0.45 | 15.2 | 11.2 |
| 2 | 0.20 | 0.45 | 16.4 | 13.6 |
| 3 | 0.47 | 0.45 | 16.7 | 14.2 |
| 4 | 0.83 | 0.45 | 17.4 | 16.0 |
| 5 | 1.9 | 0.45 | 17.6 | 17.1 |
| 6 | 1.9 | 0.0 | Negligible | |

From the above table, it will be seen that a catalyst containing a combination of iron and platinum is superior to a catalyst containing only platinum and to a catalyst containing only iron. In fact, it will be noted that at the temperature and space velocity employed, a catalyst consisting of iron on alumina is essentially completely inactive so that it is quite surprising that the addition of iron gives greatly improved results. It should be emphasized that the table set forth above gives only information with respect to percent conversion to mono-olefin and that the use of a new catalyst in accordance with this invention also gives improved performance with respect to selectivity, purity of product and, in some instances, catalyst life.

Example III

Example I is repeated except that an ammoniacal aqueous solution of palladium diamino dinitrite containing 2.5 parts of palladium is employed in place of the platinum salt solution of Example I. The resulting dehydrogenation catalyst provides excellent results and an alkylbenzene sulfonate product of excellent quality.

What is claimed is:

1. A method for producing mono-olefins from paraffins which comprises passing a mixture of paraffin material and hydrogen at a temperature of from about 400° C. to about 600° C. into contact with a catalyst comprising from .01% to 10% by weight of a first metallic component selected from the group consisting of iron, iron oxides, iron alloys, and mixtures thereof and from 0.0005% to 5% by weight of a second metallic component selected from the group consisting of noble metals of the platinum and palladium families, noble metal oxides of the platinum and palladium families, and mixtures thereof, said first and second metallic components being deposited upon the surface of an alumina catalyst support material having a surface area of at least 10 square meters per gram, an acidity factor not in excess of 2.0, and a macropore volume of at least 0.05 cc. per gram at an LHSV of from about 1 to about 100, said paraffin material consisting essentially of one or more paraffins having a chain length of from about 8 to about 24 carbon atoms.

2. A method according to claim 1 wherein said LHSV is from about 5 to about 50, and said paraffin material is a mixture of paraffins having an average chain length of from $C_{10}$ to $C_{15}$.

3. A method according to claim 2 wherein said catalyst has deposited upon the srufaces of the alumina support material from about 0.1% to about 5% iron and from about 0.02% to about 2% platinum.

4. A method according to claim 3 wherein said catalyst contains from about 0.01% to about 3% of alkali metal in combined form.

References Cited

UNITED STATES PATENTS

| | | | |
|---|---|---|---|
| 3,315,007 | 4/1967 | Abell et al. | 260—683.3 |
| 3,315,008 | 4/1967 | Abell et al. | 260—683.3 |
| 3,435,090 | 3/1969 | Abell et al. | 260—683.3 |
| 3,274,287 | 9/1966 | Moore et al. | 260—683.3 |
| 3,360,586 | 12/1967 | Bloch et al. | 260—683.3 |
| 3,538,176 | 11/1970 | Bloch | 260—683.3 |
| 3,293,319 | 12/1966 | Haeusel et al. | 260—683.3 |
| 3,310,599 | 3/1967 | Haeusel et al. | 260—683.3 |
| 3,291,755 | 12/1966 | Haeusel et al. | 260—683.3 |

DELBERT E. GANTZ, Primary Examiner

V. O'KEEFE, Assistant Examiner

U.S. Cl. X.R.

252—463, 466; 260—505